(No Model.) 2 Sheets—Sheet 1.
B. ORMEROD & G. HAWORTH.
BEARING FOR PULLEYS OR WHEELS.
No. 398,274. Patented Feb. 19, 1889.
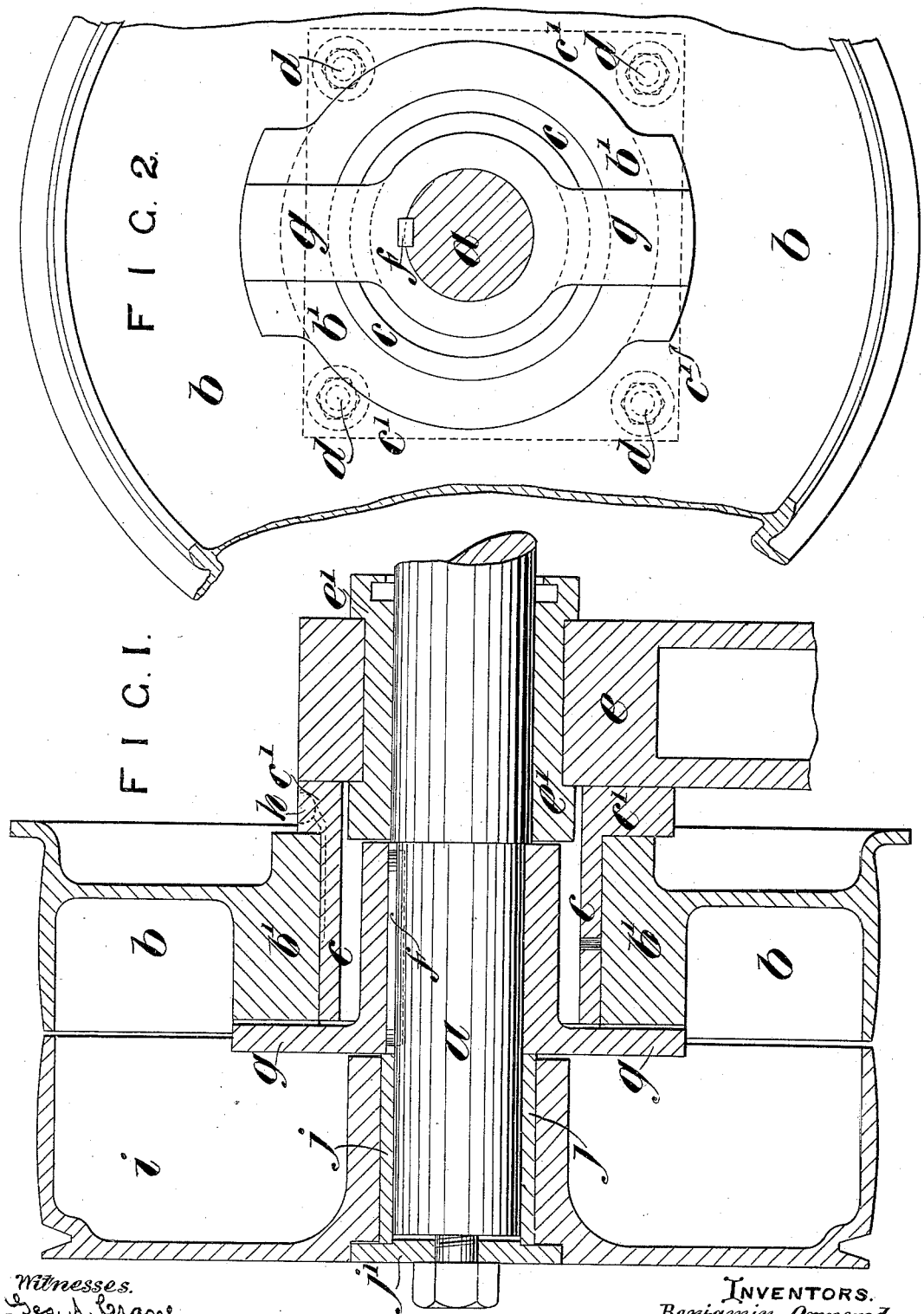
Witnesses.
Geo. A. Crane
B. J. Reynolds
Inventors.
Benjamin Ormerod,
and George Haworth,
By their Attys. Howson and Howson (No Model.) 2 Sheets—Sheet 2.

B. ORMEROD & G. HAWORTH.
BEARING FOR PULLEYS OR WHEELS.

No. 398,274. Patented Feb. 19, 1889.

Witnesses.

INVENTORS.
B. Ormerod,
G. Haworth.
By their Attys.

UNITED STATES PATENT OFFICE.

BENJAMIN ORMEROD AND GEORGE HAWORTH, OF BLACKBURN, COUNTY OF LANCASTER, ENGLAND, ASSIGNORS TO GEORGE ASHWORTH AND ELIJAH ASHWORTH, BOTH OF MANCHESTER, ENGLAND.

BEARING FOR PULLEYS OR WHEELS.

SPECIFICATION forming part of Letters Patent No. 398,274, dated February 19, 1889.

Application filed March 16, 1888. Serial No. 267,314. (No model.) Patented in England September 14, 1887, No. 12,442.

*To all whom it may concern:*

Be it known that we, BENJAMIN ORMEROD, cotton-mill manager, and GEORGE HAWORTH, chief carder, both in the employ of John Dugdale & Sons, of Blackburn, county of Lancaster, England, have invented certain Improvements in Bearings for Pulleys or Wheels, (for which we have made application for a patent in Great Britain, No. 12,442, dated September 14, 1887,) of which the following is a specification.

Our invention relates to an improvement in bearings for pulleys and wheels, our object being to prevent the transmission to the shaft of the disturbing influences due to the pull and tension of the driving-band, belt, or driving wheel, and thereby to obtain greater steadiness of motion and less axial movement, and also to lessen the general wear and the irregular wear of the bearings and journals.

Our invention will be best described with reference to the accompanying drawings.

Figure 3:
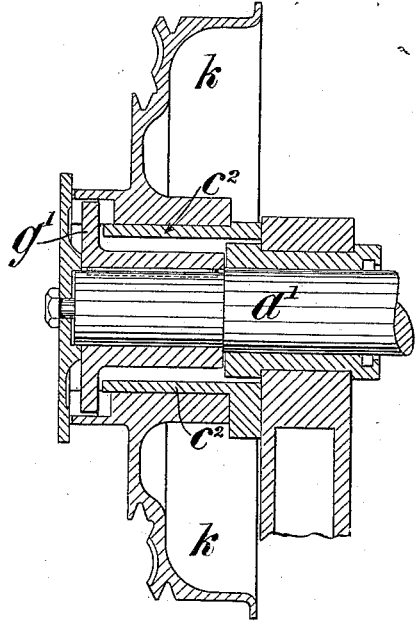
Figure 4:
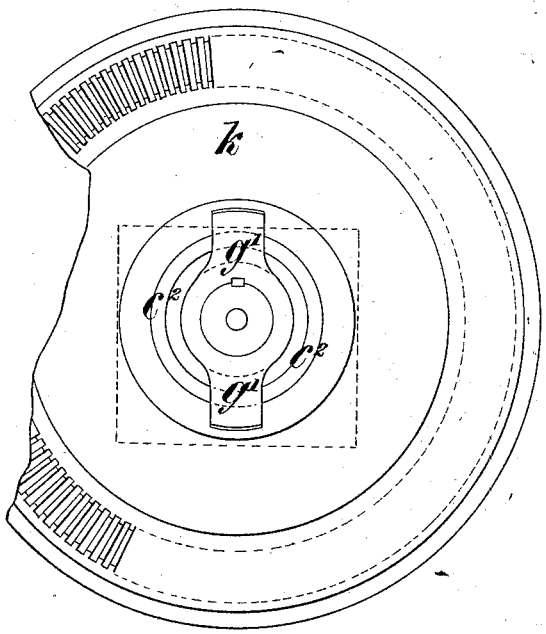
Figure 6:
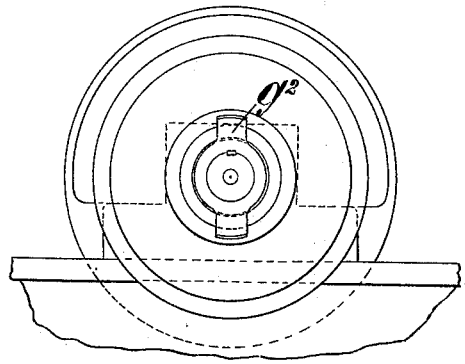
Figure 5:
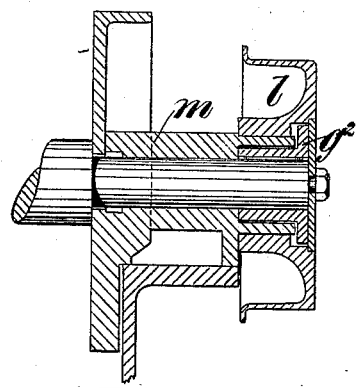
Figure 8:
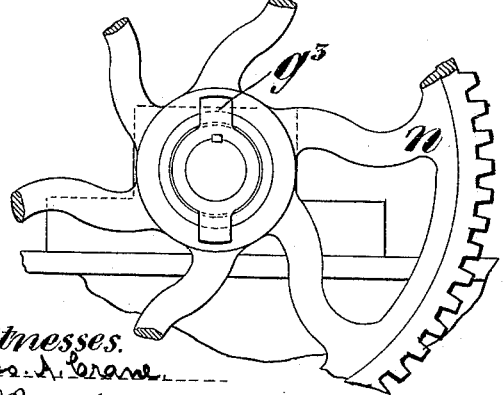
Figure 7:
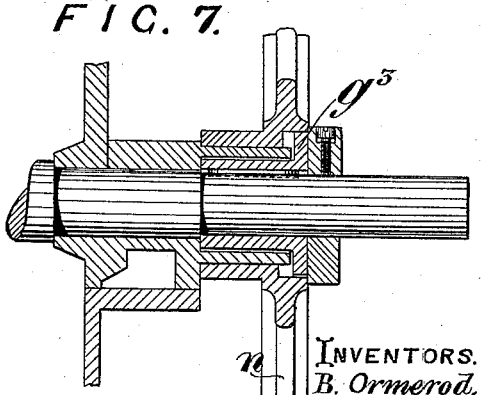

Figure 1 represents a vertical section of a carding-engine main-cylinder-shaft bearing, the fast driving-belt pulley, the loose pulley, and their bearings, one end of the main cylinder-shaft appearing in full in the same figure. Fig. 2 is a front view of the same parts, the loose pulley being omitted and the shaft being in section, the fast pulley being represented as broken at each side for want of space in the drawings. Fig. 3 is a sectional view of the bearing and pulleys at the other side of the engine, drawn to a smaller scale than Figs. 1 and 2. Fig. 4 is a broken front view of the parts represented in Fig. 3. Fig. 5 shows one end of the "licker-in" or "taker-in" shaft, with the bearing-pedestal and the driving-pulley represented in section. Fig. 6 is a front view of the parts shown in Fig. 5. Fig. 7 shows one end of the doffer-shaft, with the bearing-pedestal and the driving-wheel represented in section. Fig. 8 is a front view of the parts which appear in Fig. 7.

In Figs. 1 and 2, $a$ is the end of the main cylinder-shaft, on which is ordinarily fixed the driving-pulley, which receives motion from the line-shafting of the mill. In the example the said pulley $b$ is not fixed upon the shaft, but is mounted to revolve upon a hollow cylindrical boss, $c$, which is cast upon or formed in one piece with a plate, $c'$, which is attached by means of screws $d$ to the front of the bearing-pedestal $e$, in which are fitted the steps or bearing-brasses $e'$, in which the journal of the shaft revolves. The boss $c$ is turned to suit the bored pulley, and is also, by preference, bored. It will be seen that the pulley $b$ will revolve upon the said boss without touching the shaft $a$, and that however tight the driving-belt may be the shaft is not pulled sidewise or downward or lifted, as the case might be, by the pull of the belt. A fast key, $f$, is fixed in the shaft and enters a slot in the hub of a coupler, $g$. This coupler is formed with two arms, which enter recesses formed in the hub $b'$ of the driving-pulley. These arms are made to fit loosely in the said recesses, so that when the pulley $b$ revolves it will carry around the coupler $g$ at the same time that the arms of the coupler are free to slide in the said recesses. The effect of this arrangement is that the rotatory motion of the driving-pulley will be conveyed by the coupler to the shaft $a$, and as the only force exerted upon the coupler acts in a circular line which is about concentric with the axis of the shaft, and as such force acts upon two points or opposite sides of such axis, the turning force has no disturbing effect upon the axis of revolution of the shaft. The freedom of the coupler-arms to slide in the recesses in the pulley-hub permits of the slight want of concentricity with the axis of the shaft of the boss upon which the driving-pulley revolves which may occur through wear of the parts or adjustment of the cylinder. The oil which drips from the front end of the bearing in $e'$ may pass through holes in the shell of the boss to lubricate the bearing for the pulley $b$; but in the drawings we have shown, by dotted lines at $h$, a passage for conveying oil to the said bearing. The loose pulley $i$ revolves upon a sleeve, $j$, which is fitted upon the shaft end, and is jammed by means of a nut and washer, $j'$, against the coupler $g$. As the engine is not at work when the belt is on this loose pulley, the disturbing effect of the belt is not of much consequence. It will, however, be readily understood that the loose pulley might revolve directly upon the shaft; or, if the boss $c$ were lengthened and the fast pulley $b$ situated on the outside, both pulleys might revolve upon the said boss. The form of the coupler may be varied, and if considered to be desirable the connection between the pulley and the coupler may be made at more than two places—as, for example, the two parts might gear together, somewhat in the manner of an ordinary toothed driving-clutch.

In Figs. 3 and 4, $a'$ is the other end of the same shaft appearing in Fig. 1, and $k$ is the belt-pulley which drives the licker-in, and which has been fixed upon the shaft $a'$ previous to our invention. We mount this pulley upon a fixed hollow boss, $c^2$, in the same manner as the pulley $b$, so that it acts upon the shaft only through a carrier, $g'$, which is similar to the carrier $g$. The effect of the arrangement is that the strain of the belt which drives the licker-in and of the bands which drive other parts of the carding-engine does not affect the steadiness of motion of the main cylinder.

In Figs. 5 and 6, $l$ is the pulley which receives motion from the pulley $k$ in Fig. 3. The pulley $l$ is mounted to revolve upon a turned shell which projects from the bearing-pedestal $m$ of the licker-in shaft. The rotatory motion is transmitted from the pulley $l$ to the shaft through a coupler, $g^2$, as in the other examples, so that the steadiness of motion of the licker-in is not affected by the belt.

In Figs. 7 and 8 we have shown how the gear-wheel through which motion is imparted to the doffer may be mounted in the same manner as the belt-pulleys, in order that steadiness of movement of the doffer may be insured. The gear-wheel $n$ is mounted in the same manner as the pulley $l$ in Fig. 5, and transmits rotatory motion to the doffer-shaft through a coupler, $g^3$. It might not often be considered necessary to apply our invention to the doffer-shaft; but in cases wherein the gearing might not work smoothly such application would be of advantage.

We claim as our invention—

In bearings for pulleys or wheels, the combination of a cylindrical boss which surrounds the bearings of the shaft without touching the outer surface of such bearing, a pulley or wheel which revolves upon said boss, and the coupler engaging with the hub of the pulley and fixed on the shaft, substantially as set forth.

In testimony whereof we have signed our names to this specification in the presence of two subscribing witnesses.

BENJAMIN ORMEROD.
GEORGE HAWORTH.

Witnesses:
EDWARD K. DUTTON,
FREDK. DILLON.